United States Patent
Baertsch et al.

(10) Patent No.: US 11,654,774 B2
(45) Date of Patent: May 23, 2023

(54) PATH CORRECTION OF A VEHICLE RELATIVE TO PROJECTED MAGNETIC FLIGHT PATH

(71) Applicant: SKYTRAN, INC., Irvine, CA (US)

(72) Inventors: Robert Baertsch, Santa Cruz, CA (US); Gabriel Hugh Elkaim, Santa Cruz, CA (US)

(73) Assignee: SkyTran, Inc., Huntington Beach, CA (US)

( * ) Notice: Subject to any disclaimer, the term of this patent is extended or adjusted under 35 U.S.C. 154(b) by 180 days.

(21) Appl. No.: 16/628,645

(22) PCT Filed: Jul. 6, 2018

(86) PCT No.: PCT/US2018/041155
§ 371 (c)(1),
(2) Date: Jan. 3, 2020

(87) PCT Pub. No.: WO2019/101461
PCT Pub. Date: Jan. 10, 2019

(65) Prior Publication Data
US 2020/0130513 A1    Apr. 30, 2020

Related U.S. Application Data

(60) Provisional application No. 62/529,387, filed on Jul. 6, 2017.

(51) Int. Cl.
*B60L 13/06* (2006.01)
*B60L 15/00* (2006.01)
(Continued)

(52) U.S. Cl.
CPC ............. *B60L 13/06* (2013.01); *B60L 15/002* (2013.01); *G05D 1/08* (2013.01); *G07C 5/008* (2013.01)

(58) Field of Classification Search
CPC ......... B60L 13/06; B60L 15/002; G05D 1/08; G07C 5/008
See application file for complete search history.

(56) References Cited

U.S. PATENT DOCUMENTS

| | | | |
|---|---|---|---|
| 5,332,180 A | 7/1994 | Peterson et al. | |
| 5,477,788 A | 12/1995 | Morishita | |

(Continued)

FOREIGN PATENT DOCUMENTS

| | | | | |
|---|---|---|---|---|
| CN | 106030431 A | * | 10/2016 | ............... G06T 7/80 |
| CN | 106809251 A | | 6/2017 | |

(Continued)

OTHER PUBLICATIONS

International Search Report and Written Opinion from the Searching Authority, dated Oct. 5, 2018, 13 pages, for the corresponding International Application PCT/US2018/041155.
(Continued)

*Primary Examiner* — Vivek D Koppikar
*Assistant Examiner* — Jeffrey R Chalhoub
(74) *Attorney, Agent, or Firm* — Polsinelli PC

(57) ABSTRACT

A method controlling a vehicle moving along a guideway for magnetic flight is provided. The method includes receiving, at a controller, data generated by one or more sensors. The controller receives data relating to a projected flight path of the vehicle. The controller determines an altitude of the vehicle relative to the guideway for magnetic flight and determines a speed of the vehicle relative to the guideway for magnetic flight. The controller then calculates a deviation of the vehicle from the projected flight path. The controller adjusts the altitude of the vehicle relative to the guideway for magnetic flight by changing certain aspects of a magnetic flight suspension system causing the vehicle to more closely track the projected flight path.

20 Claims, 10 Drawing Sheets

(51) Int. Cl.
  *G05D 1/08* (2006.01)
  *G07C 5/00* (2006.01)

(56) References Cited

U.S. PATENT DOCUMENTS

| | | | |
|---|---|---|---|
| 5,904,101 | A | 5/1999 | Kuznetsov |
| 6,129,025 | A | 10/2000 | Minikami et al. |
| 9,090,167 | B2 * | 7/2015 | Wamble, III ............ B60L 13/04 |
| 2009/0103227 | A1 | 4/2009 | Morishita |
| 2015/0008294 | A1 | 1/2015 | Desbordes et al. |
| 2015/0051806 | A1 | 2/2015 | Kimiagar et al. |
| 2017/0183829 | A1 | 6/2017 | Wamble, III et al. |

FOREIGN PATENT DOCUMENTS

| | | | | |
|---|---|---|---|---|
| JP | 6023918 | B2 * | 11/2016 | ............ B60T 17/228 |
| JP | 2016155518 | A | 12/2018 | |
| WO | 1997002167 | A1 | 1/1997 | |
| WO | 2016037116 | A1 | 3/2016 | |
| WO | 2016197031 | A1 | 12/2016 | |

OTHER PUBLICATIONS

English Abstract of CN 106809251, published on Jun. 9, 2017, listed above.
Japanese Office Action for JP Patent Application No. 2020-500099, dated Jul. 5, 2022, 3 pages.
English translation for WO19997002167A1, 56 pages.
English translation for JP2016155518, 8 pages.
European Examination Report for EP Application No. 18828266.9, dated Aug. 19, 2022, 12 pages.
Paddison et al; "Controlling Flexible Structures in Maglev Vehicles"; Proceedings of the Conference on Control Applications, vol. 2, Sep. 13, 1993, pages, XP000451583. Abstract retrieved from: https://ieeexplore.ieee.org/abstract/document/348326 on Nov. 29, 2022.
Ewoud Van West et al; "Using titl-control in non-contact manipulation systems: Development of 2-DOF titling actuator with remote center of rotation"; 2010 IEEE International Conference on Robotics and Automation: ICRA 2010, May 3, 2010, pages, XP031743338. Abstract retrieved from: https://ieeexplore.ieee.org/abstract/document/5509403—on Nov. 29, 2022.

* cited by examiner

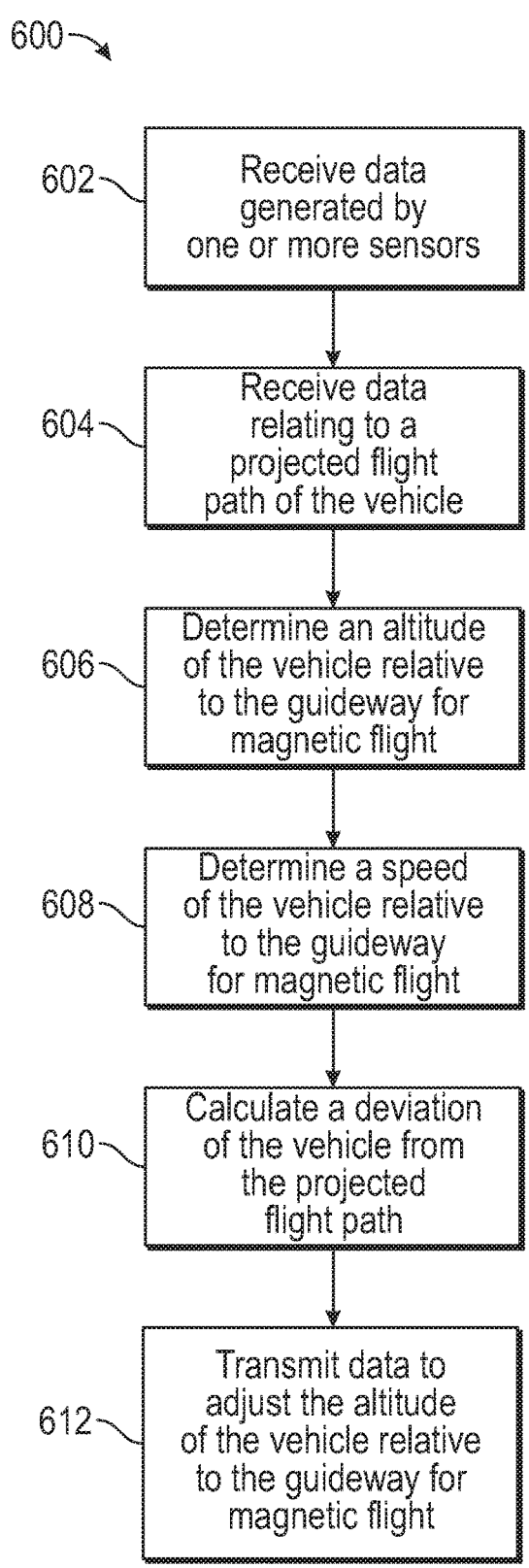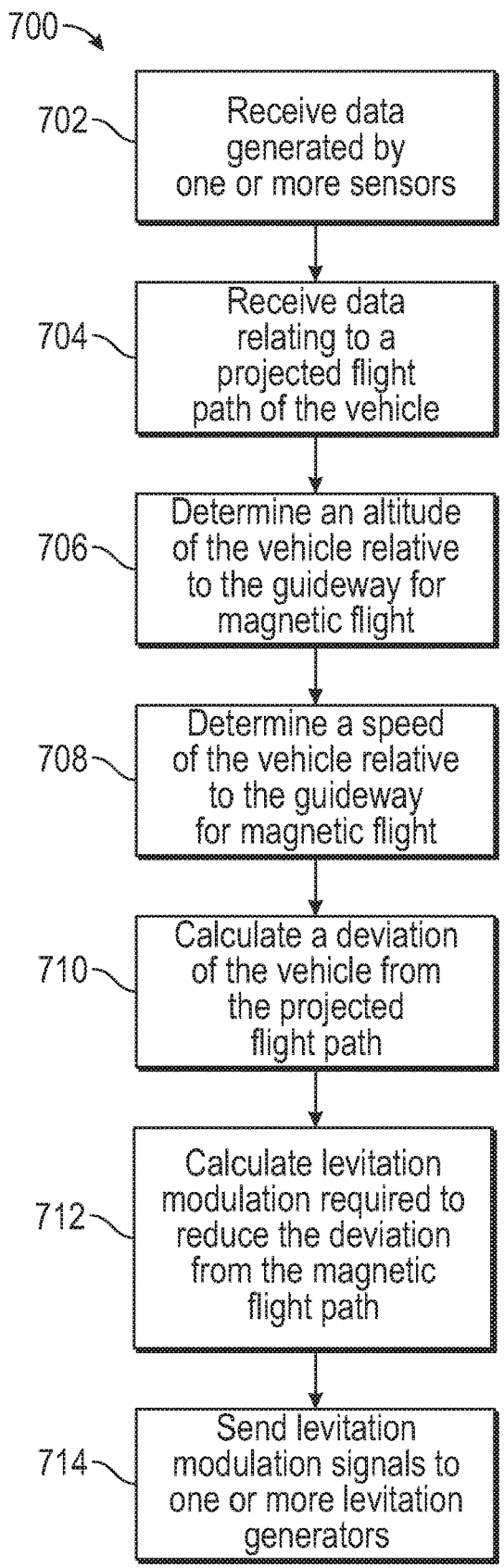
FIG. 6
FIG. 7

PATH CORRECTION OF A VEHICLE RELATIVE TO PROJECTED MAGNETIC FLIGHT PATH

CROSS REFERENCE TO RELATED APPLICATIONS

This application is a U.S. National Stage Entry of PCT Application No. PCT/US2018/041155, filed Jul. 6, 2018, which claims the benefit of U.S. Provisional Application No. 62/529,387, filed Jul. 6, 2017, the contents of which are entirely incorporated herein.

FIELD

The present disclosure relates to control of a vehicle during magnetic flight along a guideway for magnetic flight. More specifically, the present disclosure relates to minimizing vertical deviation from a projected flight path of vehicle in magnetic flight along a guideway for magnetic flight.

BACKGROUND

Transportation systems are designed to move people and cargo over distances. Transportation systems can include a vehicle that is configured to traverse a roadway or a track. The vehicle can include a suspension system that is configured to modify the motion of the passenger or cargo compartment of the vehicle to reduce vibration or other motion of the passenger or cargo compartment relative to the track or roadway. One method of providing a suspension system uses magnetic fields emanating from a moving vehicle and intersecting conductive plates on a stationary track. Vertical motion of the vehicle adjacent to vertical conductive plates induces eddy currents within the conductive plates that produce vertical forces on the moving vehicle. The forces affect the vertical motion of the vehicle. By modulating certain aspects of the magnetic fields a control system can cause vertical forces that cause the vehicle to follow a projected path along the track.

BRIEF DESCRIPTION OF THE DRAWINGS

Implementation of the present technology will now be described, by way of example only, with reference to attached figures, wherein:

FIG. 6 is a flow chart of an example of a method for controlling altitude;

FIG. 7 is a flow chart of another example of a method for controlling altitude;

Figure 1A:
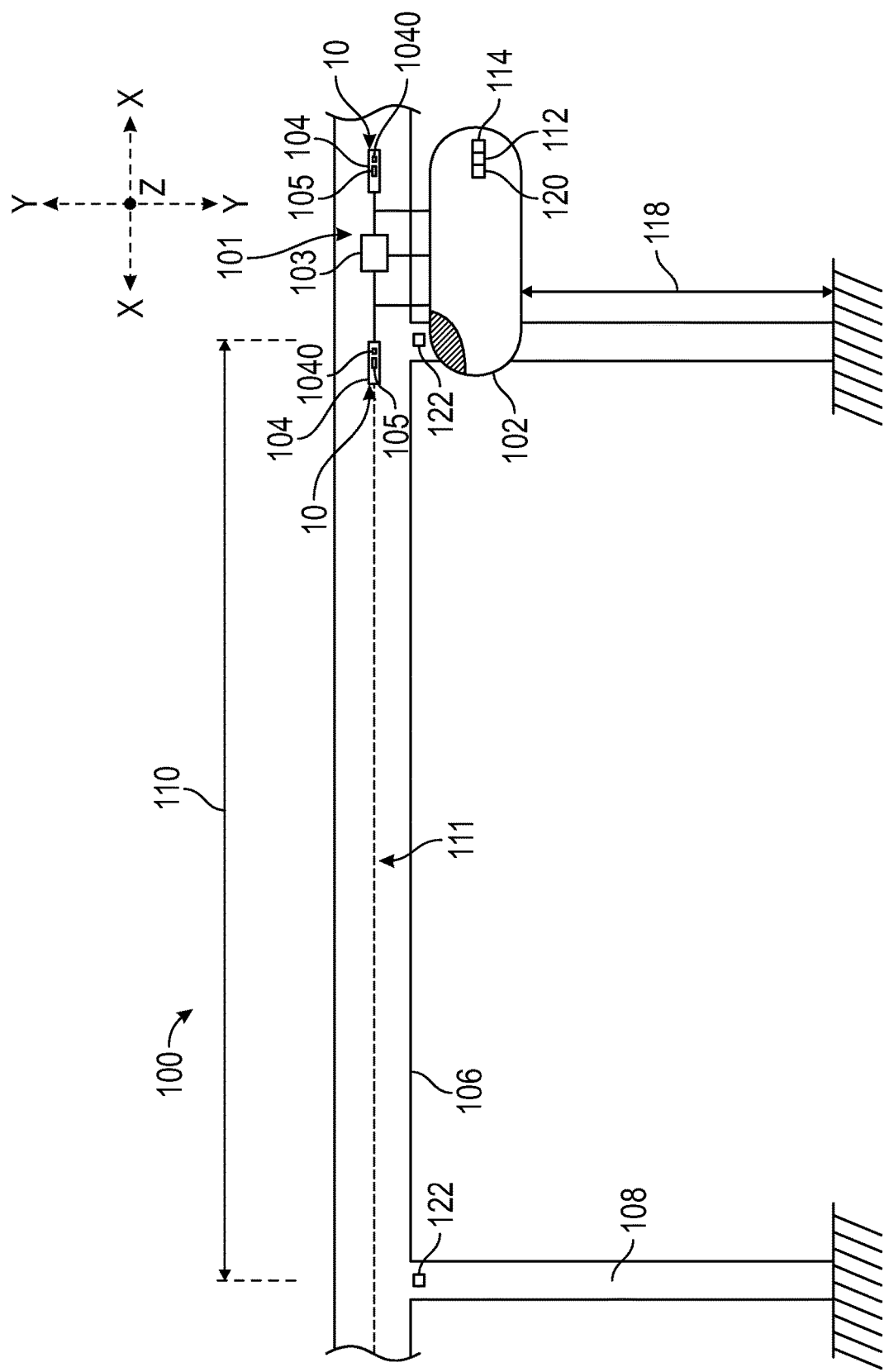
FIG. 1A is a diagrammatic view of an example of a vehicle entering a length of a guideway.

The various examples described above are provided by way of illustration only, may not be shown to scale, and should not be construed to limit the scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the examples described above can be modified within the scope of the appended claims. Claim language reciting "at least one of" a set indicates that one member of the set or multiple members of the set satisfy the claim.

DETAILED DESCRIPTION

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several terms that are used in this disclosure will now be described in non-limiting examples. The term "levitation" as used herein refers to the lifting and suspension of an object relative to another object in the absence of a mechanical contact between the objects. "Levitation force" is a force that provides for levitation. The levitation force can act in a vertical direction (the direction opposite the direction of gravity), but the same force can be used to move or position two objects in a lateral direction or in some direction with both vertical and lateral components. To generalize, the terms "levitation" and "levitation force" as used herein refer, respectively, to contactless positioning and a force between two objects in a direction substantially orthogonal to the primary direction of travel. As further used herein, "levitation magnetic flux" and "levitation force" are generally interchangeable and refer to the same element. A "levitation generator" is a device that is configured to generate magnetic waves that interact with a lifting member to levitate the movable object with respect to the stationary object.

"Drive force" refers to the force required to accelerate, maintain motion or decelerate one object with respect to another. As used herein, "drive force" means a force substantially in line with the primary direction of travel, effected without mechanical contact between the two objects. As further used herein, "drive magnetic flux" and "drive force" are generally interchangeable and refer to the same element. A "drive generator" is a device that is configured to generate magnetic waves that interact with a drive member to drive the movable object with respect to the stationary object.

A "guideway" is a device or structure that provides for a path along which a car, vehicle, bogie, or transport apparatus can move along. As used herein, the term guideway and track are generally interchangeable and refer to the same element. A car refers to a device which is configured for travel along the guideway. The car can be at least partially enclosed, entirely enclosed or have a surface upon which objects or persons can be placed. The car can be coupled with a bogie which is in turn coupled with the guideway. The bogie can be an integral component of the car or a separate component to which the car can be coupled with. A bogie as used herein does not necessarily include wheels, but instead is configured for engagement with the guideway.

A "controller" is generally a computer that executes a program to analyze data, make decisions, and send out commands. In some instances, the controller is carried on the vehicle. In other instances, the controller may be remote from the vehicle, but able to communicate with the vehicle. The controller can be an electronic device including, but not limited to, a processor, microprocessor, memory (ROM and/or RAM), and/or storage devices. The controller can be a commercial off-the-shelf (COTS) electronic device, or a specially designed for implementation with the control system.

"Coupled" refers to the linking or connection of two objects. The coupling can be direct or indirect. An indirect coupling includes connecting two objects through one or more intermediary objects. Coupling can also refer to electrical or mechanical connections. Coupling can also include magnetic linking without physical contact.

"Substantially" refers to an element essentially conforming to the particular dimension, shape or other word that substantially modifies, such that the component need not be exact. For example, substantially cylindrical means that the object resembles a cylinder, but can have one or more deviations from a true cylinder.

The term "comprising" means "including, but not necessarily limited to"; it specifically indicates open-ended inclusion or membership in a so-described combination, group, series and the like.

The term "closely" involves a strong resemblance or connection. The term "closely" can also refer to nearly, similarly, or within a desired or predetermined limit.

A "magnetic source" is any material that naturally produces a magnetic field or can be induced to generate a magnetic field. For example, a magnetic source can include a permanent magnet, an electromagnet, a superconductor, or any other material that produces a magnetic field or can be induced to generate a magnetic field.

The term "roll" refers to a rotation or oscillation about a longitudinal, or X axis; the longitudinal axis spanning between the front and the rear.

The term "pitch" refers to the vertical angle of the long axis of the levitation generator relative to the travel direction. Pitch is the rotation or oscillation of about a transverse, or Z axis, the transverse axis being perpendicular to the longitudinal axis where the transverse axis spans between two sides.

The term "altitude" as used herein refers to a distance of the midpoint or pivot point of the levitation generator from the top or bottom of the guideway.

The various examples described herein are provided by way of illustration only and should not be construed to limit the scope of the disclosure. Therefore, many such details are neither shown nor described. Even though numerous characteristics and advantages of the present technology have been set forth in this description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the examples described above can be modified within the scope of the appended claims. Claim language reciting "at least one of" a set indicates that one member of the set or multiple members of the set satisfy the claim. For example, at least one of A, B, and C, indicates the members can be just A, just B, just C, A and B, A and C, B and C, or A, B, and C.

The present disclosure is directed to a method to control altitude of a vehicle moving along a guideway for magnetic flight. The method receives, at a controller, data generated by one or more sensors. The method also receives, at the controller, data relating to a projected flight path of the vehicle. The controller determines a speed of the vehicle relative to the guideway for magnetic flight and calculates a deviation of the vehicle from the projected flight path. The controller adjusts the altitude of the vehicle relative to the guideway for magnetic flight by changing certain aspects of a magnetic flight suspension system causing the vehicle to more closely track the projected flight path. As generally used in the present disclosure, the projected flight path refers to the desired, or intended flight path.

The sensors include at least one sensor associated with a corresponding control device. The at least one sensor can be an ultrasonic or optical sensor, and the control device can be a levitation generator. To determine the speed of the vehicle relative to the guideway for magnetic flight, the controller receives a sensed horizontal velocity from one of an optical sensor, an encoder, an RFID, or a forward looking radar. The altitude of the vehicle of the guideway for magnetic flight is determined by the controller receiving data from an altitude sensor which can be at least one of a laser sensor, an optical sensor, a camera sensor, a mechanical sensor, or a magnetic sensor. The received data relating to a projected flight path of the vehicle is from a database that contains information describing guideway segments. The data is the corresponding guideway segments of an intended flight path based on a starting and ending destination of the vehicle. The deviation of the vehicle from the projected flight path is calculated by taking a difference of the projected flight path and a current position of the vehicle relative to the guideway, where the deviation can be in three dimensions, thereby determining roll, altitude, and pitch.

Certain aspects of the magnetic flight suspension system can be changed by varying an angle of one or more of a plurality of levitation generators. The angle of each of the levitation generators can be varied independent from another and can be adjusted by a drive motor. Also, a drive generator can be varied to produce a different velocity of the vehicle in changing the magnetic flight suspension system.

The present disclosure is also directed to a system configured to control a vehicle moving along a guideway for magnetic flight. The system can include a plurality of levitation generators which has at least one sensor associated therewith, a plurality of sensors operable to detect position relative to the guideway, and a controller including at least one processor unit which is operably coupled to the plurality of sensors. The controller can be configured to receive data generated by the plurality of sensors and data relating to a projected flight path of the vehicle. The controller can also determine an altitude of the vehicle relative to the guideway and a speed, using one or more of the plurality of sensors, of the vehicle relative to the guideway for magnetic flight. The controller can then calculate a deviation of the vehicle from the projected flight path and transmit data to adjust the altitude of the vehicle relative to the guideway for magnetic flight by changing certain aspects of a magnetic flight suspension system causing the vehicle to more closely track the projected flight path.

The present disclosure is also directed to a method controlling altitude of a vehicle moving along a guideway for magnetic flight. The method includes receiving, at a controller, data generated by one or more sensors and data relating to a projected flight path of the vehicle. The controller determines an altitude of the vehicle relative to the guideway for magnetic flight and a speed of the vehicle relative to the guideway for magnetic flight. The controller then calculates the deviation of the vehicle from the projected flight path and levitation modulation required to reduce the deviation from the magnetic flight path. Levitation modulation signals are sent to one or more levitation generators. The controller adjusts the altitude of the vehicle relative to the guideway for magnetic flight by levitation modulation equivalent to the deviation from the projected flight path thereby maintaining a path closer to the projected flight path While examples are illustrated in relation to a substantially horizontal guide way, the present disclosure also includes guide ways that are vertically oriented. In such vertically oriented guideways, the system can more closely resemble an elevator. In other systems, the guideway can include component that are horizontal, vertical, angled, or any combination thereof.

FIG. 1A illustrates an example of a levitation transportation system 100 with a vehicle 102 within or entering a guideway 106. The levitation transportation system 100 has a track formed by a plurality of guideway 106 pieces. Each guideway 106 piece is supported by one or more supports 108 and the segmented track pieces can have various lengths 110. While the illustrated example shows a segment of the guideway 106 having a support 108 on opposing ends, to the segmented track can include supports 108 that have varying arrangements, such as having a center support 108 with secondary supports extending therefrom.

The guideway 106 pieces can form a network of track allowing a vehicle 102 to move within the levitation transportation system 100. While the segmented guideway 106 piece that is illustrated spans the portion between two supports 108, the piece can be a portion of the span and be joined to another guideway 106 pieces on either side, such that a plurality of pieces span the portion between the two supports 108.

Figure 1B:
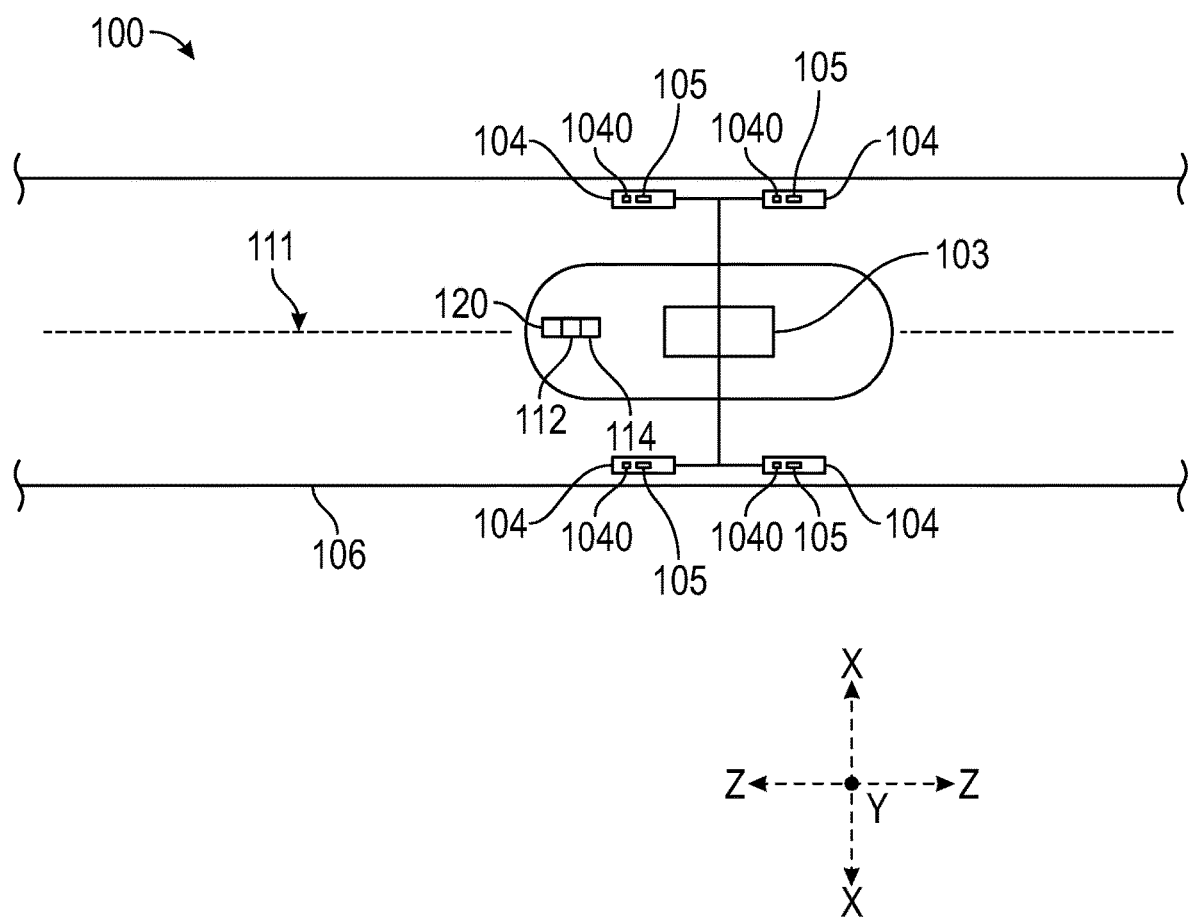
FIG. 1B is a top, diagrammatic view of an example of a vehicle in a length of a guideway.

The vehicle 102 has a magnetic flight suspension system 101 which has certain aspects that cause the vehicle 102 to more closely track a projected flight path 111 within the guideway 106. One of the aspects of the magnetic flight suspension system 101 is an control device 10 which can be a plurality of levitation generators 104. The plurality of levitation generators 104 can be at least partially received within the guideway 106 and allows the vehicle 102 to travel within the levitation transportation system 100. The levitation generators 104 can magnetically engage and interact with the guideway 106 to guide the vehicle 102 along the transportation system 100. The levitation generators 104 and the guideway 106 are not designed to physically touch as the vehicle 102 travels within the levitation transportation system 100, rather the levitation generator 104 generates a levitating magnetic force to elevate the levitation generator 104 above or at a spaced distance (but within the segmented track) from the guideway 106. One or more than one levitation generators 104 can be implemented. FIG. 1A shows two levitation generators 104, but in other illustrated examples, as in FIG. 1B, four levitation generators 104 are used, with two more levitation generators 104 being parallel with the two shown levitation generators 104 in FIG. 1. The four levitation generators 104 can each pitch, or rotate about a Z axis, to adjust the altitude, roll, and/or pitch of the vehicle 102.

The levitation generators 104 can be operable to adjust pitch by varying an angle of one or more of the levitation generator 104. As such, the levitation generators 104 can adjust the altitude, roll, and/or pitch of the vehicle 102 by varying the combination of the levitation generators 104, which will be described in further detail below. As the levitation generators 104 can be varied independent from one another, the vehicle 102 can be adjusted in three dimensions relative to the guideway 106. The levitation generators 104 can be adjusted by a drive motor 1040. In at least one example, each of the levitation generators 104 has a corresponding drive motor 1040. In other examples, pairs of levitation generators 104 can be communicatively controlled by a drive motor 1040 such that the drive motor 1040 adjusts two corresponding levitation generators 104.

The magnetic flight suspension system 101 can also include changing and varying a drive generator 103. One or more than one drive generator 103 can be included in the levitation transportation system 100. The drive generator 103 is configured to provide a drive force. Varying the drive generator 103 produces a different velocity of the vehicle 102. As the velocity of the vehicle 102 increases due to the drive generator 103, the altitude of the vehicle 102 will increase. Varying different combinations between each of the four levitation generators 104 and the drive generator 103 adjusts the altitude 118 of the vehicle 102 relative to the guideway 106.

Figure 2:
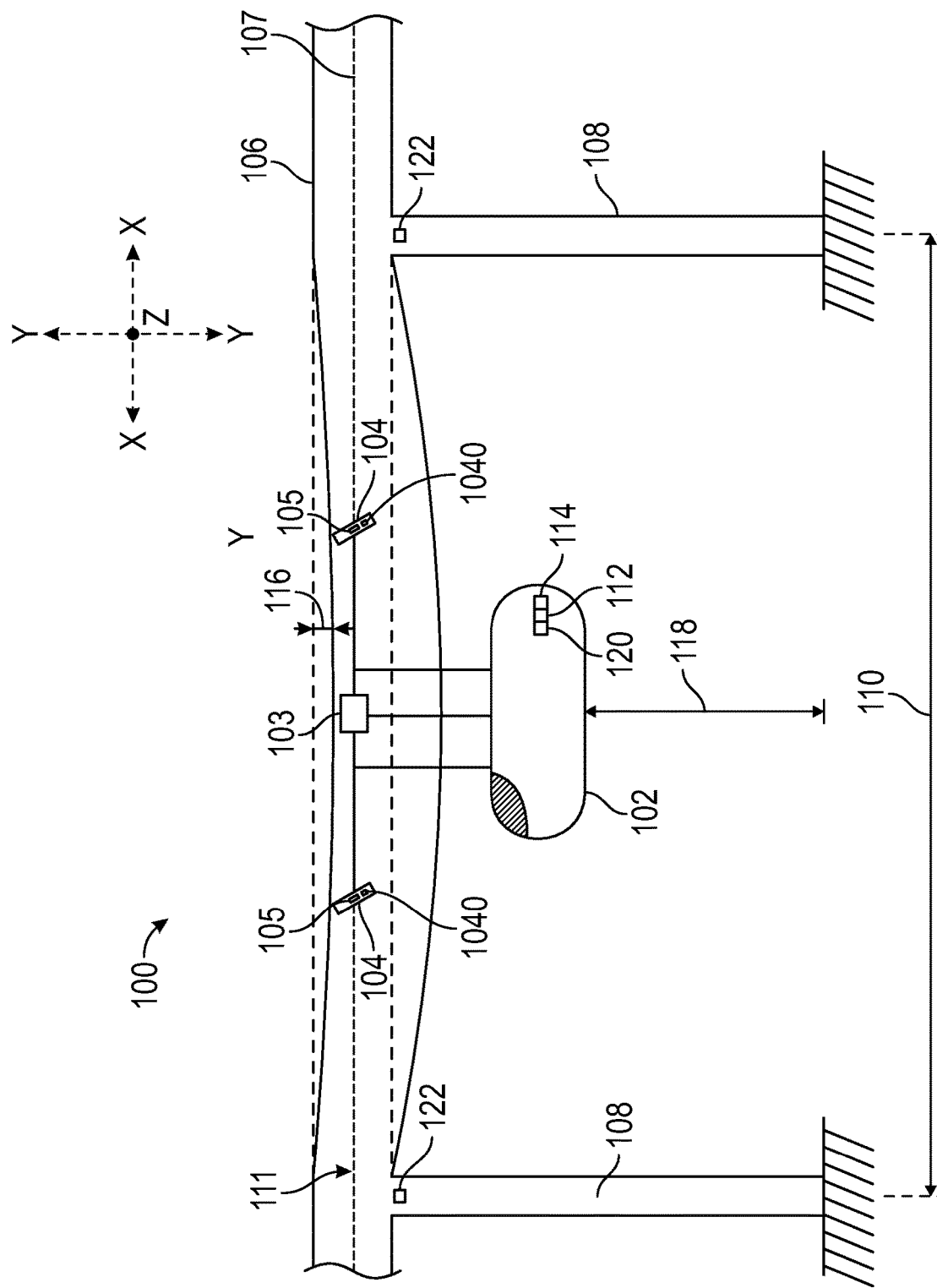
FIG. 2 is a diagrammatic view of an example of a levitation generator maintaining a predetermined altitude of a vehicle along a deflected guideway.

The vehicle 102 can include a controller 114 capable of changing certain aspects of the magnetic flight suspension system 101 to cause the vehicle 102 to more closely track the projected flight path 111, for example by maintaining a predetermined altitude 118 as the vehicle 102 traverses within the levitation transportation system 100. For example, the guideway 106, as shown in FIG. 2, can have a deflection 116 over the length 110 of the guideway 106 in the projected flight path 111 of the vehicle 102. The deflection 116 can occur due to a variety of different factors. For example, the deflection 116 can occur because of a change of path in the guideway 106. In other examples, the deflection 116 can occur due to the weight of the guideway 106 itself. Additionally, the deflection 116 can occur because of the weight of one or more vehicles 102 traveling along the guideway 106. The deflection 116 in the projected flight path 111 can be a vertical deflection, as in FIG. 2, a pitch deflection, as in FIG. 4, a rotational deflection, as in FIG. 5, or a combination thereof. For a vertical deflection, the altitude of the vehicle is adjusted; for a pitch deflection, the pitch of the vehicle is adjusted; and for a rotational deflection, the roll of the vehicle is adjusted. The controller 114, by changing certain aspects of the magnetic flight suspension system 101, can adjust the roll, altitude, and/or pitch of the vehicle 102 to offset for the deflection 116 of the guideway 106 in the projected flight path 111 and more closely track the projected flight path 111. The controller 114 can be configured to receive and determine information about the vehicle 102 and guideway 106. The controller 114 can be a processor, microprocessor, computer, server, or any other electronic device capable of determining the deflection of the length 110 of guideway 106 in response to information received from one or more sensors.

The vehicle 102 can also be adjusted by the controller 114 changing certain aspects of the magnetic flight suspension system 101 to adjust to variations of the vehicle 102 to more closely track the projected flight path 111. For example, as will be further discussed below, passengers, in the vehicle 102, can move around which may cause unwanted rotation, such as rotation about the X axis. The controller 114 can adjust individual levitation generators 104 to correct the position of the vehicle 102.

The controller 114 receives relevant information or data related to the levitation transportation system 100 such as the projected flight path 111, the altitude 118, the spacing of supports 108, and the length 110 of the segmented track. In at least one example, the received data relating to the projected flight path 111 of the vehicle 102 is from a database that contains information describing segments of the guideway 106. The data relating to the projected flight path 111 of the vehicle 102 is based on the corresponding guideway segments 106 of an intended flight path based on a starting and ending destination of the vehicle 102.

In determining the altitude 118 of the vehicle 102, the controller 114 can receive data from an altitude sensor 112. The altitude sensor 112 can be located in the vehicle 102, or in other examples, the altitude sensor 112 can be located in the guideway 106 and/or the supports 108. The altitude sensor 112 can be at least one of a laser sensor, an optical sensor, a camera sensor, a mechanical sensor, a magnetic sensor, or any suitable sensor to determine altitude of the vehicle 102. The controller 114 can also determine information such as the weight and speed of the vehicle 102. In determining the speed of the vehicle 102 relative to the guideway 106 for magnetic flight, the controller 114 receives a sensed horizontal velocity. The horizontal velocity is in relation to the guideway 106. The speed of the vehicle 102 can be based on data received from one of an optical sensor, an encoder, an RFID, a forward looking radar, or any other suitable sensor or method to determine speed of the vehicle 102. The weight of the vehicle 102 can include the weight of the vehicle 102, weight of passengers, payload, cargo, or any combination thereof. In at least one example, the controller 114 determines the weight of the vehicle 102 instantaneously. In at least one example, the controller 114 determines, instantaneously, the weight of the vehicle 102, along with contents of the vehicle 102, which can include one or more of the passengers, payload, and/or cargo. In other examples, the controller 114 receives the weight of the vehicle 102 at launch of the vehicle 102 within the levitation transportation system 100.

The controller 114 can receive data from one or more sensors 120 coupled with the levitation transportation system 100. The one or more sensors 120 can be disposed on the vehicle 102, the guideway 106, and/or the supports 108. The one or more sensors 120 can be optical, radio, and/or near field communicator configured to determine altitude, speed, weight, location, or any combination thereof. The one or more sensors 120 provide the controller 114 with data necessary to determine deflection 116 of the guideway 106. In at least one example, the one or more sensors 120 include at least one sensor 105 associated with a corresponding control device 10, such as a levitation generator 104. For example, the one or more sensors include at least four ultrasonic or optical sensors 105, each of which is associated with a corresponding levitation generator 104. As illustrated, the sensor 105 is coupled with the levitation generator 104; in other examples, the sensor 105 can be coupled elsewhere, for example the vehicle 102. The one or more sensors 105 can be ultrasonic or optical sensors configured to interact with the guideway 106.

In additional examples, the one or more sensors 120 can include laser sensors configured to encode and/or transmit data between adjacent vehicles 102. The encoded/transmitted data can be the length 110 of segmented track, deflection of the segmented track, speed of adjacent vehicles, weight of adjacent vehicles, and/or any other data necessary to the controller 114.

As can be seen in FIG. 1, the one or more sensors 120 can be communicatively coupled with a transmitter 122 which can be disposed on the support 108 to receive data relative to the length 110 of guideway 106. The data assists the controller 114 in determining the anticipated deflection 116 of the upcoming length 110 of guideway 106 as the vehicle 102 travels along the guideway 106. Also, the data assists the controller 114 in determining any deviation of the vehicle 102 from the projected flight path 111.

At least one of the one or more sensors 120 can communicate with the transmitter 122 disposed on the support 108 to receive data relating the length 110 of the guideway segment 106. The transmitter 122 can be a barcode, such as a Quick Response (QR) code, a radio frequency identification (RFID) tag, or similar device configured to provide data to the one or more sensors 120.

The transmitter 122 can be disposed on the support 108, the guideway 106, or any portion of the levitation transportation system 100 with communication range of the one or more sensors 120. In the illustrated example, the transmitter 122 is on the support 108. The transmitter 122 can be located at different portions of the levitation transportation system 100. For example, the transmitter 122 can be located on the guideway 106 at a joint or in the middle. The data associated with the transmitter 122 can be static or dynamic. In situations where the data associated with the transmitter 122 is dynamic, the data received by the vehicle 102 can include the weight of the preceding vehicle(s) 102, the temperature of the rail, the ambient air temperature, the weight of the following vehicle(s) 102, or any other necessary information.

The transmitter 122 can store data relating to the projected flight path 111, for example the length 110 or path of the guideway 106 between two or more supports 108. In FIG. 1, the transmitter 122 communicates the length 110 of guideway 106 between two supports 108. In other examples, the transmitter 122 can communicate data relating to two or more lengths 110 of guideway 106, thus reducing the total number of transmitters 122 necessary within the levitation transportation system 100.

The controller 114, after receiving data generated by the one or more sensors 120, data relating to the projected flight path 111 of the vehicle 102, and after determining the altitude 118 and the speed of the vehicle 102 relative to the guideway for magnetic flight, calculates the a deviation of the vehicle 102 from the projected flight path 111. The deviation of the vehicle 102 from the projected flight path 111 can occur because of deflection of the guideway 106 or other factors such as wind, passenger movement, or other factors. The deviation of the vehicle 102 from the projected flight path 111 can also occur because of factors such as the speed based on the rotation of the drive generator 103, angles of the levitation generators 104, weight of the vehicle 102, or any other possible factors.

The controller 114 then calculates a levitation modulation required to reduce the deviation from the projected flight path 111 and sends levitation modulation signals to one or more levitation generators 104 such that the levitation generators 104 adjust its pitch. The controller 114 adjusts the altitude of the vehicle 102 relative to the guideway for magnetic flight by levitation modulation equivalent to the deviation from the projected flight path 111, thereby maintaining a path closer to the projected flight path 111. Modulation of the angle or pitch of the levitation generators 104 change the lift vector at each levitation generator 104, thus affecting the vertical motion of the vehicle 102. The combination of changing angles or pitches of individual levitation generators 104 permits the controller 114 to adjust the vehicle 102 in terms of altitude, roll, and/or pitch.

FIG. 2 illustrates a vehicle 102 within a deflected length 110 of guideway 106 of a levitation transportation system 100. The length 110 of guideway 106 can be deflected from the weight of the vehicle 102 or is deflected because of the projected flight path 111. As illustrated in FIG. 2, the deflection is temporary and the guideway 106 returns to the original altitude. In other examples, the slope of the guideway 106 in the projected flight path 111 can have different gradients or be extended over a longer distance. In yet other examples, the height of the guideway 106 may not return to its previous height, for example if the vehicle 102 is to be returned to the ground. The deflection 116 is mathematically predictable and can be calculated using the known weight and speed of the vehicle 102, and length 110 of the guideway 106. The controller 114 calculates the deviation of the vehicle 102 from the projected flight path 111 and is able to determine the deviation in terms of the altitude, roll and/or pitch. The controller 114 calculates the deviation of the vehicle 102 by taking a difference of the projected flight path 111 and a current position of the vehicle 102 relative to the guideway 106. The controller 114 can calculate the deflection 116 of the guideway 106 in view of the vehicle 102 weight, speed, and the length 110 of the guideway 106. The controller 114 then adjusts the levitation of the vehicle 102 to accommodate for the deflection 116 and maintain the predetermined altitude 118.

Figure 3:
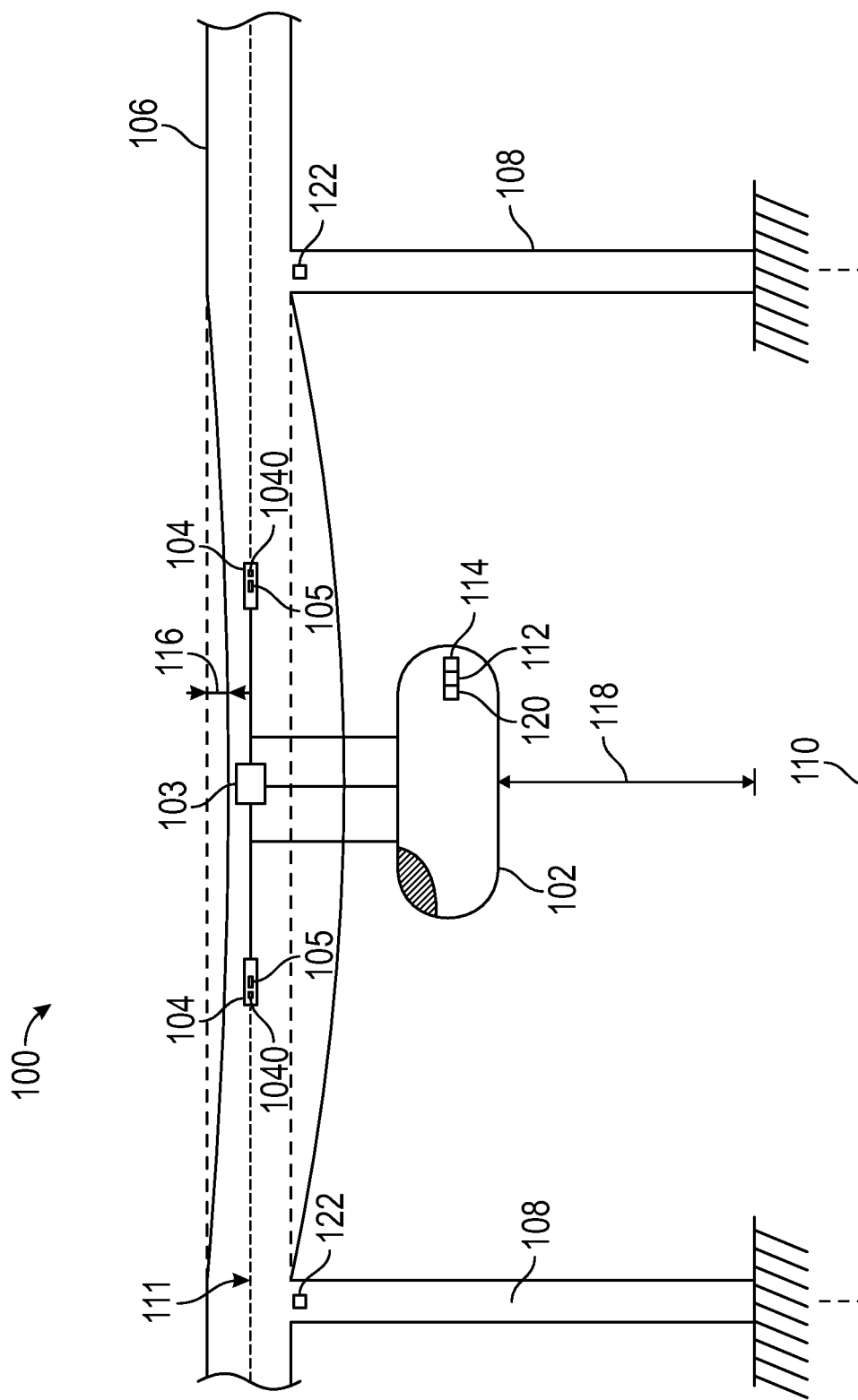
FIG. 3 is a diagrammatic view of an example of a vehicle having an increased speed to maintain a predetermined altitude.

The controller 114 can adjust the levitation or altitude of the vehicle 102 to maintain the predetermined altitude 118 in a number of ways including, but not limited to, increasing the speed of the vehicle 102 or adjusting the pitch of the levitation generators 104, thereby generating more levitation, as illustrated in FIG. 3. FIG. 2 illustrates a vehicle 102 having the levitation generators 104 pitched to increase levitation relative to the levitation generator of FIG. 1, thereby maintaining the predetermined altitude 118. To compensate for altitude, the levitation generators 104 collective pitch upward or downward as desired such that the vehicle 102 maintains balance. For example, to lower the altitude, the levitation generators 104 can collectively pitch downward. Conversely to raise the altitude, the levitation generators 104 can collectively pitch upward.

The guideway 106 can have one or more markings 107 disposed on an inner surface thereof. The one or more markings 107 can project a level flight path on a deflected guideway 106. The one or more markings 107 can be colored paint, reflective tape, reflective paint, or any similar marking providing a contrast with the inner surface of the guideway 106. In some instances, the one or more markings 107 can be disposed on the inner surface to project a level flight path under different guideway 106 situations, i.e. one vehicle, two vehicles, three vehicles.

The sensors 105 on the levitation generators 104 can be capable of determining their position relative to the one or more markings 107, thereby maintaining a level flight path. The sensors 105 can detect deviation away from the marking 107 and instruct the controller 114 to adjust the pitch of the levitation generator 104 to maintain the level flight path. The controller 114 can have pre-calculated deflection stored therein for each guideway 106 under various circumstances. The controller 114 can adjust the levitation generator 104 and altitude sensors from one marking 107 to another marking 107 if conditions of the transportation system 100 change, for example a vehicle entering/exiting the guideway 106.

FIG. 3 illustrates a vehicle 102 having an increased speed relative to the segmented track while having a levitation generator 104 with a substantially similar pitch to the levitation generator 104 of FIG. 1. The drive generator 103 can increase the speed relative to the guideway 106 which increases the levitating force generated by the levitation generator 104, thus allowing the vehicle 102 to maintain the predetermined altitude 118.

The controller 114 adjusts the levitation of the vehicle 102 to maintain a substantially linear direction of travel, the predetermined altitude 118. Similarly, the altitude of the vehicle 102 may change due to other factors such as passenger weight or movement, or wind. The controller 114 can also adjust the altitude of the vehicle 102 to cause the vehicle 102 to more closely track the projected flight path 111.

Figure 4:
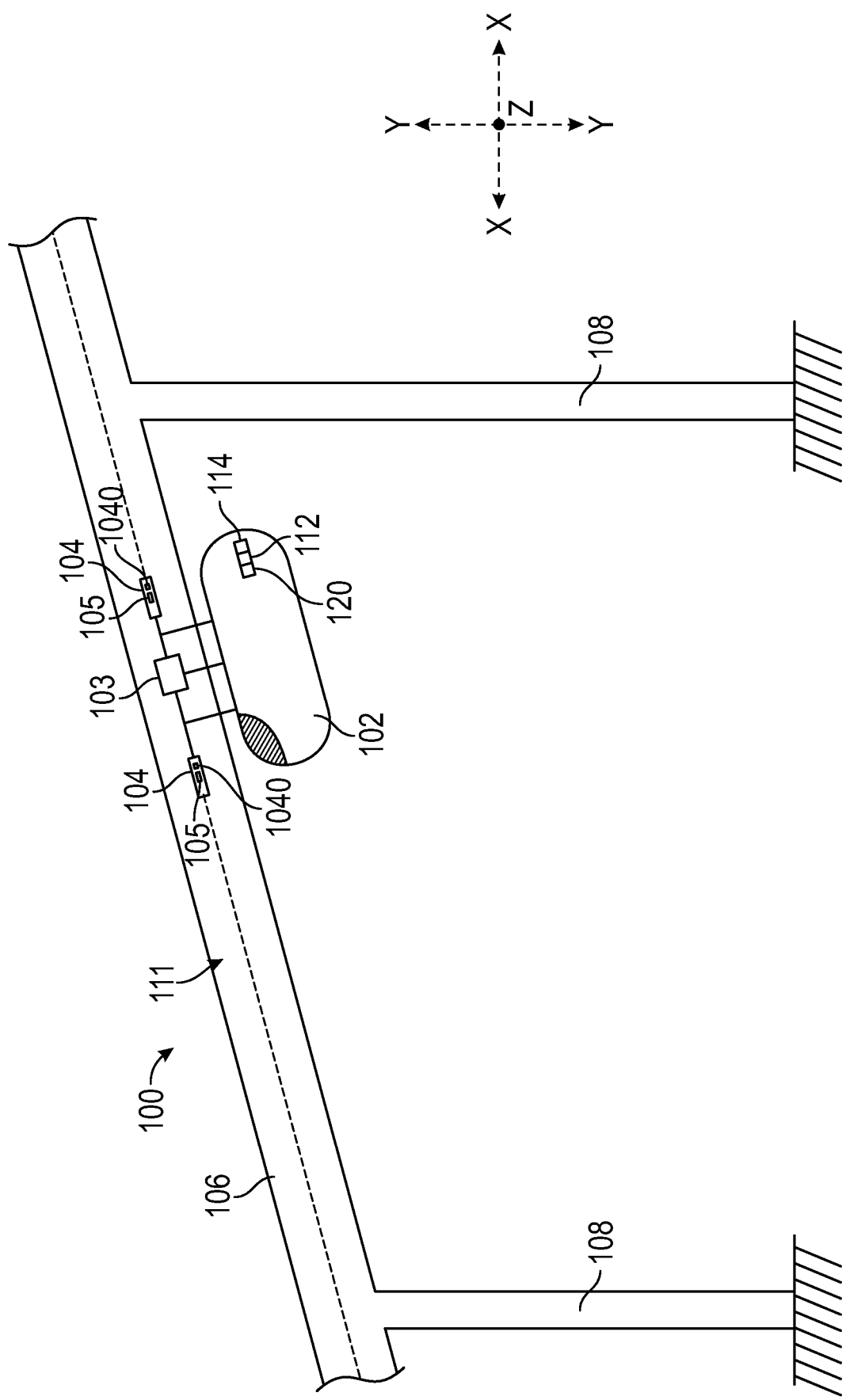
FIG. 4 is a diagrammatic view of an example of a vehicle having a pitch deviation.

In situations where the segmented track is arranged in a substantially non-horizontal configuration, such as a declining slope or an increasing slope, the controller 114 can adjust the pitch of the vehicle 102 to account for the deflection of and more closely track the substantially non-horizontal segmented guideway 102, as illustrated in FIG. 4. While FIG. 4 is illustrated with a continuous downward slope, the pitch of the vehicle 102 may be adjusted to compensate for an upward slope, varying slopes, and/or any vertical deflection such that the pitch of the vehicle 102 is adjusted to more closely track the guideway 106 and projected flight path 111. Also, the pitch of the vehicle 102 may be adjusted to compensate shifting or unbalance of weight within the vehicle 102 between the front and rear of the vehicle 102. In FIG. 4, the guideway 106 has a downward slope such that the pitch of the vehicle 102 is adjusted to more closely track the projected flight path 111 within the guideway 106. The pitch of the vehicle 102 can be adjusted by changing the pitch or angle between the front and rear levitation generators 104. As such, to compensate for a higher end such that that end of the vehicle 102 is to be lowered, the levitation generators 104 on the higher end pitch downward and/or the levitation generators 104 on the lower end can pitch upward. Conversely, to compensate for a lower end such that that end of the vehicle 102 is to be raised, the levitation generators 104 on the lower end pitch upward and/or the levitation generators 104 on the higher end can pitch downward.

Figure 5:
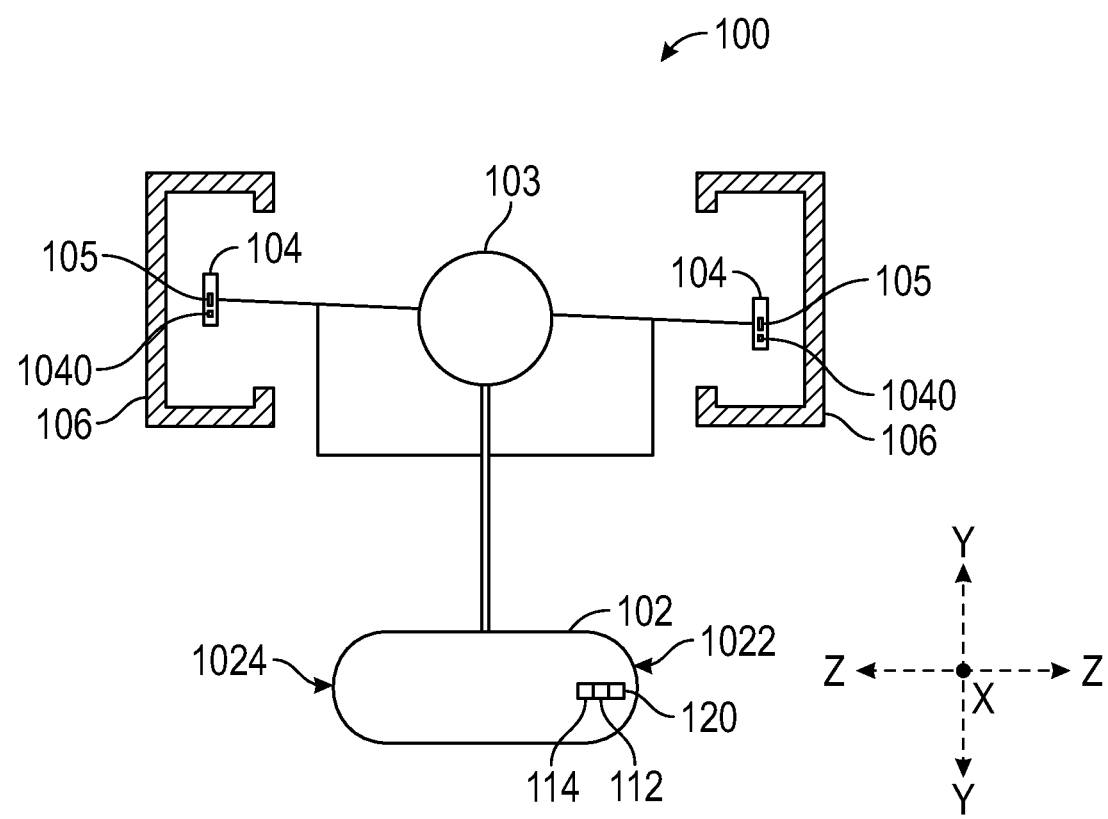
FIG. 5 is a diagrammatic view of an example of a vehicle having a roll deviation.

FIG. 5 is a front view of the transportation system 100, illustrating changing of certain aspects of a magnetic flight suspension system 101 causing the vehicle 102 to rotate, or roll, to more closely track the projected flight path 111. The deviation of the vehicle 102 from the projected flight path is illustrated as a roll. The controller 114 calculates the deviation of the vehicle 102 from the projected flight path 111 and is able to determine the deviation as roll. The controller 114 calculates the deviation of the vehicle 102 by taking a difference of the projected flight path 111 and a current position of the vehicle 102 relative to the guideway 106. The vehicle 102 may rotate or roll because of many factors, including movement of passengers, wind, change in direction, or any other possible factors. Individual or paired levitation generators 104 can be adjusted to cause the vehicle 102 to more closely track the projected flight path 111 and/or to correct any unwanted roll. By adjusting the pitch of levitation generators 104 on one side, the vehicle 102 may roll about the X axis to more closely track the desired projected flight path 111 or correct any unwanted alignment. To compensate for roll, the levitation generators 104 on the low side can pitch upward and/or the levitation generators 104 on the high side can pitch downward. As illustrated in FIG. 4, the vehicle 102 has rolled such that the right side 1022 (from the illustrated perspective) has dropped to a lower altitude than the left side 1024. To rotate the vehicle 102 in a counter-clockwise direction (from the illustrated perspective), the levitation generators 104 on the right side can pitch upward and/or the levitation generators 104 on the left side can pitch downward. If the vehicle 102 has rolled such that the left side 1024 has dropped to a lower altitude than the right side 1022, and/or to rotate the vehicle 102 in a clockwise direction (from the illustrated perspective, the levitation generators 104 on the left side can pitch upward and/or the levitation generators 104 on the right side can pitch downward.

While the change of the altitude, pitch, and roll are separately discussed above, any combination can be implemented. Pitches of the four individual levitation generators 104 can provide adjustment to deviations in three dimensions.

The number of vehicles in a length 110 of guideway 106 can vary depending on the length 110 of the segmented track, the vehicle 102 speed, the spacing between vehicles, the number of vehicles in the levitation transportation system 100, and/or the frequency/popularity of the path. Certain routes, destinations, or segmented guideways 106 can have a different use rate changing the potential number of vehicles 102 within a length 110 of guideway 106.

Referring to FIG. 6, a flowchart is presented in accordance with an example. The example method 600 is provided by way of example, as there are a variety of ways to carry out the method 600. The method 600 described below can be carried out using the configurations illustrated in FIGS. 1-5, for example. Each block shown in FIG. 6 represents one or more processes, methods or subroutines, carried out in the example method 600. Furthermore, the illustrated order of blocks is illustrative only and the order of the blocks can change according to the present disclosure. Additional blocks may be added or fewer blocks may be utilized, without departing from this disclosure. The example method 600 can begin at block 602.

At block 602, the method 600 receives, at the controller, data generated by one or more sensors. The one or more sensors includes at least one sensor associated with a corresponding control device. The control device can be a levitation generator, and the at least one sensor can be an ultrasonic or optical sensor. In at least one example, the one or more sensors includes at least four ultrasonic or optical sensors, each of which is associated with a corresponding levitation generator.

At block 604, the method 600 receives, at the controller, data relating to a projected flight path of the vehicle. The projected flight path of the vehicle can be from a database that contains information describing guideway segments. The data can be corresponding guideway segments of an intended flight path based on a starting and ending destination of the vehicle.

At block 606, the method 600 determines, at the controller, an altitude of the vehicle relative to the guideway for magnetic flight. The controller can receive data from an altitude sensor. The altitude sensor can include at least one of a laser sensor, an optical sensor, a camera sensor, a mechanical sensor, a magnetic sensor, or any other suitable sensor.

At block 608, the method 600 determines, at the controller, a speed of the vehicle relative to the guideway for magnetic flight. The controller may receive a sensed horizontal velocity. The speed of the vehicle can be based on data received from one of an optical sensor, an encoder, an RFID, a forward looking radar, or any other suitable sensor or method.

At block 610, the method 600 calculates, at the controller, a deviation of the vehicle from the projected flight path. To calculate the deviation, the controller can take a difference of the projected flight path and a current position of the vehicle relative to the guideway. The controller is able to calculate the deviation in three dimensions, thereby determining roll, altitude, and pitch.

At block 612, the method 600 transmits, from the controller, data to adjust the altitude of the vehicle relative to the guideway for magnetic flight by changing certain aspects of a magnetic flight suspension system causing the vehicle to more closely track the projected flight path. The vehicle can be adjusted by varying an angle of one or more of a plurality of levitation generators. The angle of each of the plurality of levitation generators can be varied independent from one another, and the angle of each of the plurality of levitation generators can be adjusted by a drive motor. Also a drive generator can be varied to produce a different velocity of the vehicle.

Referring to FIG. 7, a flowchart is presented in accordance with an example. The example method 700 is provided by way of example, as there are a variety of ways to carry out the method 700. The method 700 described below can be carried out using the configurations illustrated in FIGS. 1-5, for example. Each block shown in FIG. 7 represents one or more processes, methods or subroutines, carried out in the example method 700. Furthermore, the illustrated order of blocks is illustrative only and the order of the blocks can change according to the present disclosure. Additional blocks may be added or fewer blocks may be utilized, without departing from this disclosure. The example method 700 can begin at block 702.

At block 702, the method 700 receives, at the controller, data generated by one or more sensors. The one or more sensors includes at least one sensor associated with a corresponding control device. The control device can be a levitation generator, and the at least one sensor can be an ultrasonic or optical sensor. In at least one example, the one or more sensors includes at least four ultrasonic sensors, each of which is associated with a corresponding levitation generator.

At block 704, the method 700 receives, at the controller, data relating to a projected flight path of the vehicle. The projected flight path of the vehicle can be from a database that contains information describing guideway segments. The data can be corresponding guideway segments of an intended flight path based on a starting and ending destination of the vehicle.

At block 706, the method 700 determines, at the controller, an altitude of the vehicle relative to the guideway for magnetic flight. The controller can receive data from an altitude sensor. The altitude sensor can include at least one of a laser sensor, an optical sensor, a camera sensor, a mechanical sensor, a magnetic sensor, or any other suitable sensor.

At block 708, the method 700 determines, at the controller, a speed of the vehicle relative to the guideway for magnetic flight. The controller may receive a sensed horizontal velocity. The speed of the vehicle can be based on data received from one of an optical sensor, an encoder, an RFID, a forward looking radar, or any other suitable sensor or method.

At block 710, the method 700 calculates, at the controller, a deviation of the vehicle from the projected flight path. To calculate the deviation, the controller can take a difference of the projected flight path and a current position of the vehicle relative to the guideway. The controller is able to calculate the deviation in three dimensions, thereby determining roll, altitude, and pitch.

At block 712, the method 700 calculates, at the controller, levitation modulation required to reduce the deviation from the magnetic flight path. The levitation modulation can be in terms of roll, altitude, and/or pitch.

At block 714, the method 700 sends, from the controller, levitation modulation signals to one or more levitation generators. The controller adjusts the altitude of the vehicle relative to the guideway for magnetic flight by levitation modulation equivalent to the deviation from the projected flight path thereby maintaining a path closer to the projected flight path. The vehicle can be adjusted by varying an angle of one or more of a plurality of levitation generators. The angle of each of the plurality of levitation generators can be varied independent from one another, and the angle of each of the plurality of levitation generators can be adjusted by a drive motor. Also a drive generator can be varied to produce a different velocity of the vehicle.

The described levitation and propulsion system and method calculates a deviation of the vehicle from the projected flight path. To calculate the deviation, the controller can take a difference of the projected flight path and a current position of the vehicle relative to the guideway. The controller is able to calculate the deviation in three dimensions, thereby determining roll, altitude, and pitch. Using a simplified model of magnetic forces and converting these to lift and drag in the body frame of the vehicle/bogie, a set of non-linear differential equations that characterize the flight of the vehicle and coupling between forward velocity and flight height, pitch, and roll can be derived.

Figure 8:
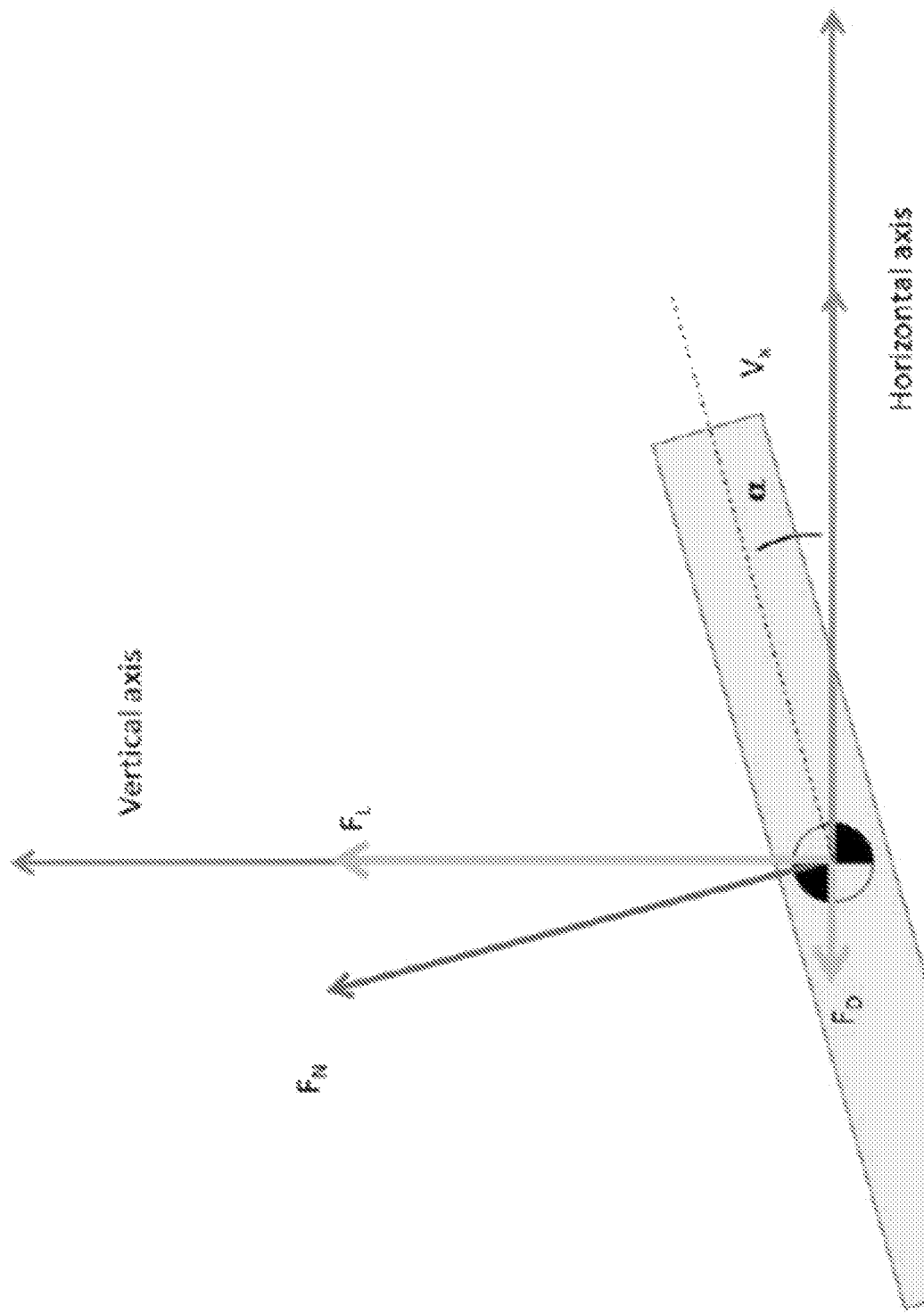
FIG. 8 illustrates the basic wing geometry showing horizontal velocity and resultant forces.

Referring to FIG. 8, the simplified model consists of a single force that acts perpendicular to the geometric angle of the levitation generator to the velocity, and the force is characterized as the product of a constant ($C_L$) with the horizontal velocity (V) and the sine of the angle ($\alpha$) between them:

$$F_N = C_L V \sin \alpha$$

The wing angle ($\alpha$) is positive above the horizontal axis, and it is noted that the angle is relative to the horizontal axis of the guideway (and will thus be affected when climbing through a switch or descending through a switch). From this, the single force can be resolved into a "lift" component ($F_L$) which is required to balance the weight of the vehicle, and a "drag" component ($F_D$) that retards the forward motion of the vehicle and needs to be overcome by the thrust generated:

$$F_L = F_N \cos \alpha = C_L V \sin \alpha \cos \alpha$$

$$F_D = F_N \sin \alpha = C_L V \sin^2 \alpha$$

From these simple equations, the entire simplified dynamics of the system can be modeled and simulated, and from these a flight control system designed.

When climbing or descending, the angle ($\alpha$) will be decreased or increased as a function of the vehicle velocity. The lift forces oppose the weight of the vehicle and the drag forces must be overcome by the propulsion system.

The coefficient of lift ($C_L$) is a constant that encapsulates the magnetic permeability of the track, the spacing of the magnets on the wing, and the gap between the wing magnets and the guidetrack wall. Analytic and experimental data generally indicate a linear relationship between the ($C_L$) and wing guidetrack wall gap.

Using these same simplified equations the "twooze" of the vehicle can also be modeled. The twooze is the magnetic feedback such that if the vehicle is dropped within the track, it will not accelerate at one g, but rather will reach a steady state vertical velocity and hold that velocity while falling until it runs out of track height. This is the so-called "twooze" of the vehicle. The descent appears to be through some invisible highly viscous substance that slows the vehicle down. Using the above equations and noting that $\alpha$ will be 90 degrees when falling vertically, the equations of motion become constant coefficient linear ordinary differential equations:

$$-m\ddot{y} = -mg + C_L \dot{y}$$

Defining $v_y \triangleq \dot{y}$ then the equation reduces to:

$$\dot{v}_y = g - \frac{C_L}{m} v_y$$

This shows the steady state behavior of $$v_y(\infty) = -\frac{mg}{C_L}$$

as expected, and has a closed form solution of:

$$v_y = -\frac{mg}{C_L}\left(1 - e^{\frac{C_L}{m}t}\right)$$

The vertical velocity starts at zero (0) and asymptotically approaches a steady state speed.

Figure 9:
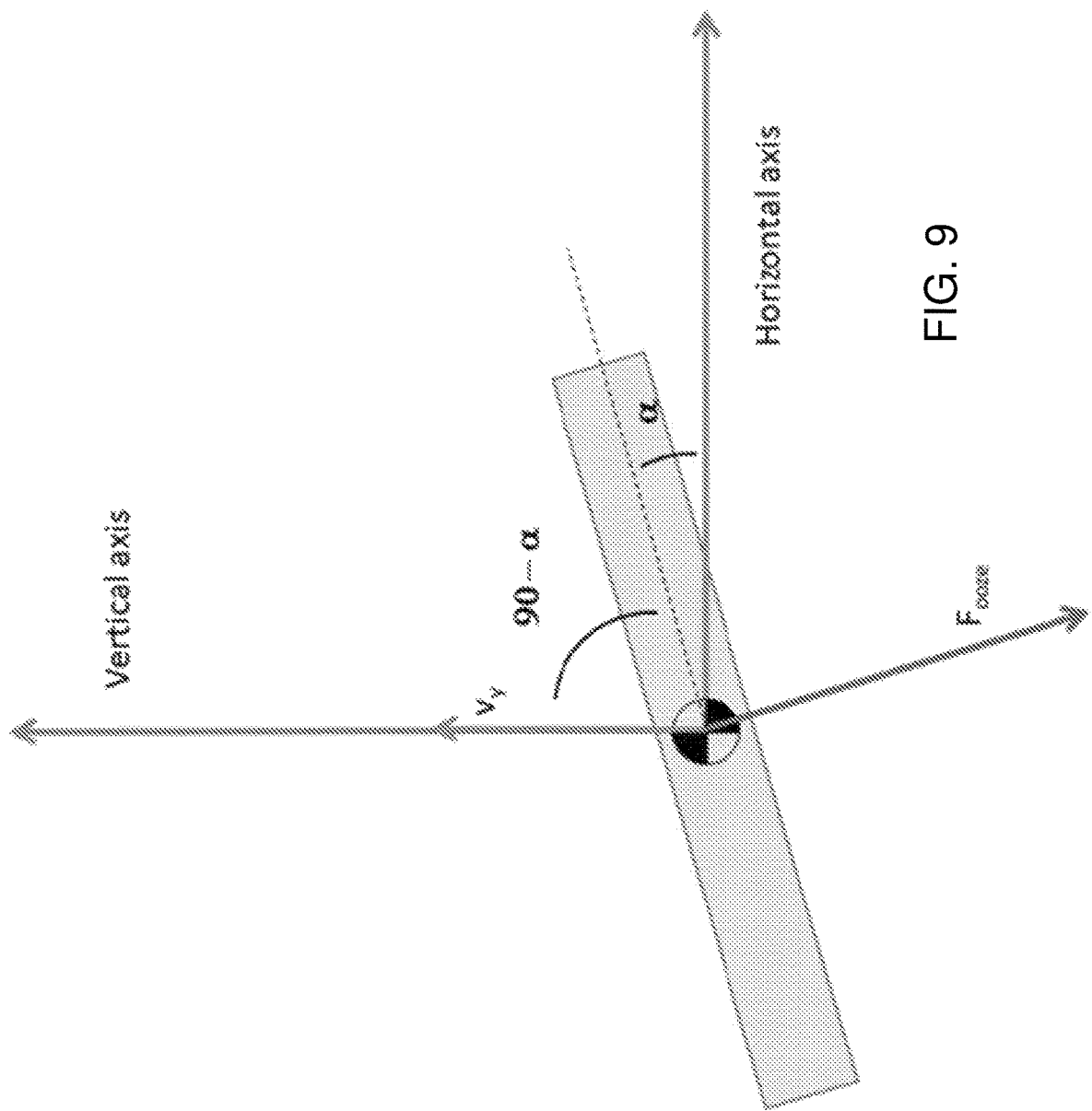
FIG. 9 illustrates forces when a wing is set to an angle and has a vertical velocity.

In practice, the vehicle is seldom if ever in vertical motion with the wings set to zero angle of attack. When the vehicle is in motion with the wings set at an angle of attack ($\alpha$), the twooze acts much like a wing. As illustrated in FIG. 9, the relationship of forces is similar to those of a wing in horizontal flight.

$$F_{ooze} = C_L v_y \sin(90° - \alpha) = C_L v_y \cos(\alpha)$$

$$F_y = -F_{ooze} \cos(\alpha) = -C_L v_y \cos^2(\alpha)$$

$$F_x = F_{ooze} \sin(\alpha) = C_L v_y \cos(\alpha)\sin(\alpha)$$

Given this modeling of lift forces on the vehicle, the assumption of a known ($C_L$) for the wings, the vertical motion of the vehicle can be modelled as a combination of direct lift and twooze forces:

$$\ddot{y} + \frac{C_L}{m} \cos\alpha \dot{y} = \frac{C_L}{m} V \sin\alpha \cos\alpha - g$$

Here, $\alpha$ is the effective angle of the wing (geometric angle and induced angle from climb/descent), g is the acceleration due to gravity, and m is the vehicle mass. In one configuration, the vehicle has four wings, with two forward, and two aft. This can be modelled as all wings at the same geometric angle and multiplying the lift coefficient by four to represent all wings together. The lift and drag from horizontal motion has been separated out from the twooze effect which is due to vertical motion ($\dot{y}$). This could alternatively be modelled as a reduction in the wing geometric angle. Regardless, it may be simpler to rely on superposition and model the forces as separate effects which sum.

In the equation above, when the vehicle is in a steady state level flight ($v_y=0$), then there exists an equilibrium between the nominal geometric angle ($\alpha_0$), the nominal horizontal velocity ($V_0$), and the coefficient of lift ($C_L$). This is achieved when:

$$C_L V_0 \sin \alpha_0 \cos \alpha_0 = mg$$

The $_0$ notation is used to indicate that this is a nominal constant. Using standard trigonometric identities, this can be restated as:

$$\alpha_0 = \frac{1}{2}\sin^{-1}\left(\frac{2\,mg}{C_L V_0}\right)$$

This establishes the required nominal levitation generator angle as a function of vehicle mass, nominal horizontal velocity and magnetic coefficient of lift.

The system can also use the same magnetic eddy current properties for propulsion. In this instance, the magnets are arranged in a helical spiral and the guideway is a tube wrapped around the spiral magnets. By rotating the spiral magnets using a spool motor, the vehicle develops thrust which can be used to overcome drag and to climb along the guideway. In some arrangements two spiral magnets are rotated in opposite directions to cancel out net torque.

Figure 10:
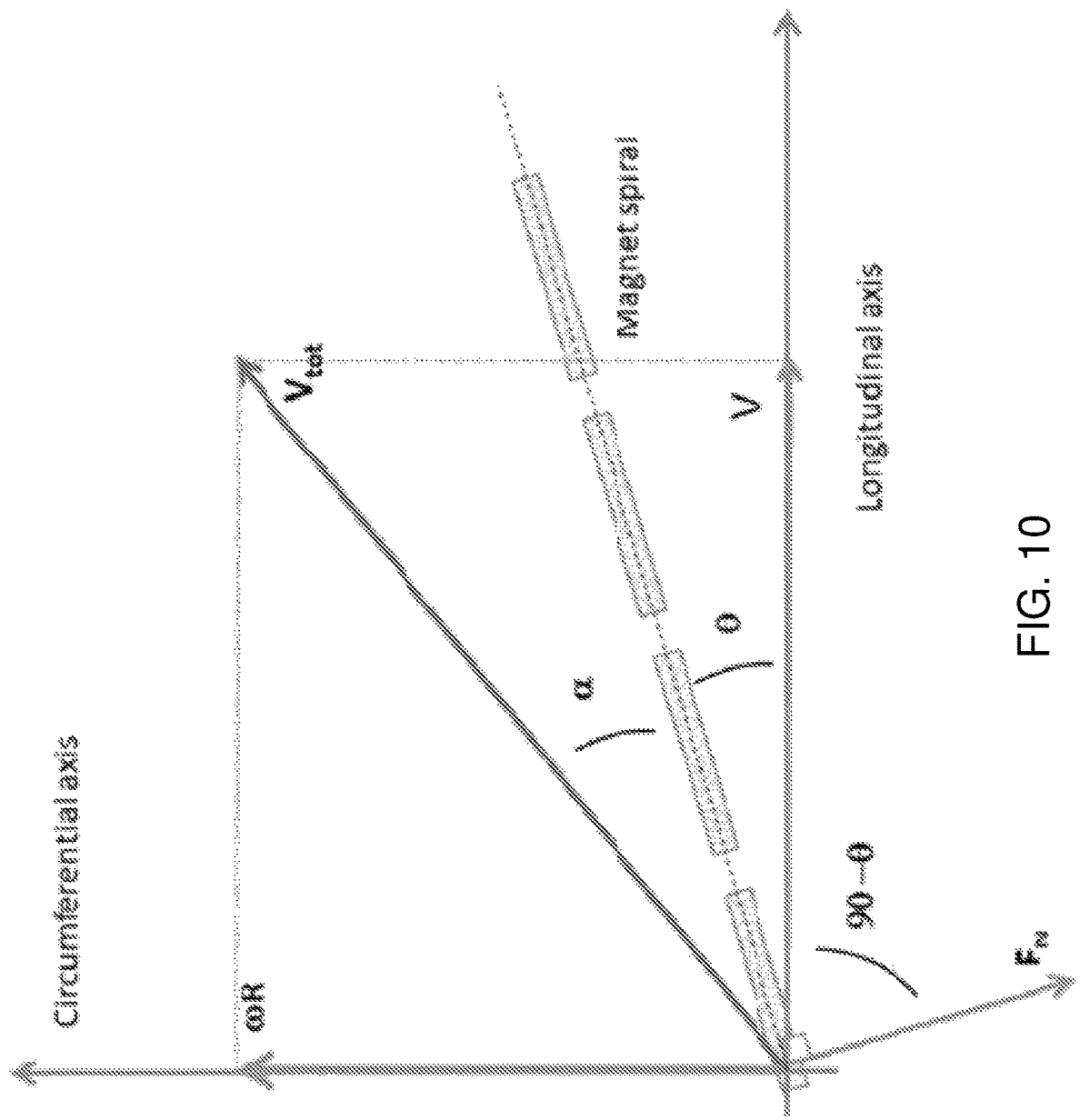
FIG. 10 illustrates the relationship between magnets of a spiral motor, horizontal velocity and rim speed.

The spiral magnet motors generate force based on the spiral angle, and speed of rotation. This can be illustrated by referring to FIG. 10, where the spiral angle of the magnets is $\phi$, and $\omega R$ is the rim speed of the motor spool. Generation of propulsive force requires a slip angle between the magnets and the total velocity of the spool motor. The force normal ($F_N$) to the spiral magnet is developed as described above, but a different coefficient of lift ($C_L^*$) is used to account for the different magnets and permeability of the spool motor. $V_{tot}$ is the vector sum of the vehicle longitudinal velocity $V$ and the rim speed $\omega R$ of the spiral motor, and $\alpha$ is the angle between the magnet spiral and the total velocity.

$$F_N = C_L^* V_{tot} \sin(\alpha)$$

Resolving the spool motor normal force into the axial or along-track component gives thrust ($F_{Thrust}$) for the spool motor:

$$F_{Thrust} = \frac{C_L^*}{2}[\sin 2\theta \cdot R\omega - 2V \sin^2 \theta]$$

In one aspect the coefficient of lift for the propulsion system ($C_L^*$) can be determined as:

$$C_L^* = \frac{2C_L \sin^2 \alpha_o + \rho V_o A C_d}{\frac{\omega_o R}{V_o}\sin 2\theta - 2\sin^2 \theta}$$

where $\theta$=pitch angle of magnets in the spool,
R=radius of the spool,
$\omega$=angular speed of the spool,
V=velocity of the vehicle,
$C_L$=coefficient of lift of all wings,
$C_d$=coefficient of air drag,
$\rho$=air density,
A=frontal area of vehicle $$m\delta\dot{v} + C_L \cos\alpha_o \delta\dot{v} = C_L[\sin\alpha_o + V_o \cos(2\alpha_o)] \cdot \delta\alpha + \frac{C_L \sin 2\alpha_o}{2}\delta v$$

Generally, non-linear equations are difficult to solve directly and cannot be used for control system synthesis. As such, a linearized perturbation set of equations are derived using the nominal trim/equilibrium values such that the resulting set of equations are linear constant coefficient ordinary differential equations about said equilibrium point (alpha$_0$, omega$_0$, v$_0$, target altitude, pitch, roll and axial velocity). The use of perturbation variables about the equilibrium conditions involves a Taylor Series expansion of the trigonometric and power functions and neglecting the effect of higher order terms.

To determine altitude, the system dynamics become a state space representation of the linear constant coefficient ordinary differential equations for the combine longitudinal/horizontal motion and the vertical motion where the state is [$\delta v$ $\delta y'$ $\delta y$], and the inputs are [$\delta\omega$ $\delta\alpha$]. It should be noted that the coupling, g/V$_0$ from [$\delta v$] into the vertical acceleration is quite small and that the vertical and longitudinal channels can be decoupled as long as the control system nulls out the coupling.

The pitch control is designed to superimpose upon the height control system. That is the input is the differential angle of the levitation generators off of equilibrium, with a positive pitch on the front levitation generators and negative pitch on the rear levitation generators being positive. The equations are expanded about the equilibrium position (nominal pitch is flat). The state of the pitch controller is [$\delta\theta'$ $\delta\theta$] and the input is [$\delta\alpha_\theta$].

Similar to the pitch control, the roll control is also designed to superimpose upon the height control system. That is the input is the differential angle of the levitation generators off of equilibrium, with a positive levitation generators on the port side and negative levitation generators on the starboard side of the vehicle being a positive input. The equations are expanded about the equilibrium position (nominal roll is flat). The state of the roll controller is [$\delta\phi'$ $\delta\phi$] and the input is [$\delta\alpha_\phi$].

The equilibrium motor speed is a function of the lift generated on the propulsion motor in the tube, forward speed of the vehicle, magnet angle. This can also be recast as solving for the coefficient of lift given the motor speed, vehicle velocity, radius of the drive member, and geometric angle of the magnets.

The full longitudinal equations are weakly coupled, and can be separated into a vehicle velocity (axial) speed equation, and the vertical equations. Though they do interact, these can be treated separately with independent control systems because the interaction is weak. The equations are derived from the full coupled equations by deleting the appropriate columns and rows from the coupled system. The resulting state is [$\delta v'$ $\delta v$] and the input is [$\delta\omega$].

Using the full perturbation models of the coupled system, the vertical equations of motion are only weakly driven by the changes in the axial vehicle velocity. Given this weak coupling, a control system topology was designed that separates out the vehicle velocity, altitude control, with respect to the track, pitch control, and roll control. The control system topology is based on the super position of a vertical channel controller, a pitch channel controller, and a roll channel controller. Each of these command input signals to levitation generator angle are added with appropriate sign to the nominal angle ($\alpha_0$) required to maintain flight.

The control system is designed to regulate the system about its nominal targets in height, pitch, and roll is developed using the linear perturbation dynamics and feeding back the perturbation states (not the full state). The gains are calculated as a fixed matrix, K which multiples the perturbation states and derivation of those states, where the perturbation states are dependent on which of the three controllers are implemented. The gain matrix K is generated such that the integral of sum square of the normalized perturbation states and the normalized actuator input over an infinite time horizon is minimized. This is a linear-quadratic regulator (LQR) using Bryson's rule, however it modified by using the perturbation rather than the full state.

A limiting factor on control system performance for the actual flight vehicle is a limit on levitation generator angle acceleration. In order to constrain the control system, to respect those acceleration limits, the state is augmented to include levitation generator angle angular speed and levitation generator angle position. The new output of the control system is thus the commanded levitation generator acceleration. Again, using LQR with Bryson's rule, a new constant gain matrix is computed to generate an output command acceleration of the levitation generator. The actuator however, is not driven by acceleration, rather it is driven by commanded position. Thus, offline closed form integration is used to compute the target position from the commanded acceleration.

A full state estimator requiring matrix multiplication is burdensome for an embedded computer that is recalculating the commanded output at every control system time step. A closed form, least squares estimator for the rate variable is implemented. This least squares estimator is optimized to yield a set of constant coefficients to multiple the previous N measurements in order to generate the velocity estimate with minimal computational load on the embedded processor.

A reduced order estimator is implemented to only estimate those perturbation variables not directly measured by the sensor suite. In doing so, the computational burden on the embedded processor is largely reduced. Furthermore, where measured variables are available, the estimates of those variables are not used in the control calculations. Thus, the control system maintains a higher performance. This is accomplished by reordering and partitioning the perturbation dynamics matrices, in order to separate the perturbation states into the unknown vs. the measured states. The physics model embodied in the A matrix is used to estimate the values of the unknown states.

In order to smoothly switch or effectuate a trajectory for track sag, a feedforward trajectory is implemented that precomputes the perturbation states for an entire trajectory maneuver. In this way the control system effort is minimized. The trajectory is then parameterized based on a distance down the track rather than time. The set of perturbation states, down the track, through the maneuver, is sent to the control system as on offset to the perturbation states and a feed-forward input to control system actuator. By wrapping the already described feedback loop, around this nominal feedforward trajectory, the vehicle will both track the commanded trajectory, and do so with the minimum control effort. Furthermore this structure compensates for mismatch between the vehicle's actual position and the desired trajectory.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. A method controlling a vehicle moving along a guideway for magnetic flight, the method comprising:
    receiving, at a controller, data generated by one or more sensors;
    receiving, at the controller, data relating to a projected flight path of the vehicle;
    determining, at the controller, an altitude of the vehicle relative to the guideway for magnetic flight;
    determining, at the controller, a speed of the vehicle relative to the guideway for magnetic flight;
    calculating, at the controller, a deviation of the vehicle from the projected flight path, calculating, at the controller and based at least on the deviation and the speed, a state space of the vehicle;
    transmitting, from the controller, data corresponding to the state space, the data used to change an angle of at least one of a plurality of levitation generators or change the speed of the vehicle;
    receiving, at one or more drive motors and/or drive generator, the transmitted data and adjusting the angle of at least one of the plurality of levitation generators or changing the speed of drive generator; and
    powering a drive motor that is coupled to at least one of the plurality of levitation generators to adjust the angle of the at least one of the plurality of levitation generators, such that a pitch of a front levitation generator can be adjusted independent of a rear levitation generator, wherein the plurality of levitation generators are operable to adjust the altitude, roll, and/or pitch of the vehicle.

2. The method of claim 1, wherein the one or more sensors includes at least one sensor associated with a corresponding one of the plurality of levitation generators.

3. The method of claim 2, wherein the at least one sensor is an ultrasonic sensor.

4. The method of claim 1, wherein the one or more sensors comprises at least four ultrasonic sensors, the at least four ultrasonic sensors associated with a corresponding levitation generator.

5. The method of claim 1, wherein the state space is calculated using one or more of an altitude controller, a pitch controller, and a roll controller.

6. The method of claim 5, wherein the altitude controller, pitch controller, and roll controller are portions of a state space controller.

7. The method of claim 5, further comprising using the altitude controller to calculate a change in an angle of at least one of the plurality of levitation generators.

8. The method of claim 5, further comprising using the pitch controller to calculate a change in an angle of at least one of the plurality of levitation generators.

9. The method of claim 5, further comprising using the roll controller to calculate a change in an angle of at least one of the plurality of levitation generators.

10. The method of claim 5, further comprising using the altitude controller to calculate a change in commanded velocity of the vehicle.

11. The method of claim 5, further comprising using the pitch controller to calculate a change in commanded velocity of the vehicle.

12. The method of claim 5, further comprising using the roll controller to calculate a change in commanded velocity of the vehicle.

13. The method of claim 1, further comprising calculating a change in an angle of at least one of the plurality of levitation generators.

14. The method of claim 1, further comprising determining a difference of the projected flight path and a current position of the vehicle relative to the guideway.

15. The method of claim 1, further comprising determining the deviation in three dimensions, and using the deviation in three dimensions to determine roll, altitude and pitch.

16. The method of claim 1, further comprising changing an angle of one or more of the plurality of levitation generators.

17. The method of claim 1, further comprising changing an angle of a first one of the plurality of levitation generators independent of changing an angle of a second one of the plurality of levitation generators.

18. A system configured to control a vehicle moving along a guideway for
magnetic flight, the system comprising:
a plurality of sensors operable to detect vehicle position relative to the guideway;
a plurality of levitation generators, the plurality of levitation generators having at least one of the plurality of sensors associated therewith;
at least one controller comprising at least one processor unit and operably coupled to at least one of the plurality of sensors and at least one of the plurality of levitation generators, the at least one controller configured to:
receive data generated by at least one of the plurality of sensors;
receive data relating to a projected flight path of the vehicle;
determine an altitude of the vehicle relative to the guideway;
determine a speed, using at least one of the plurality of sensors, of the vehicle relative to the guideway for magnetic flight;
calculate a deviation of the vehicle from the projected flight path;
calculate a state space of the vehicle based at least on the deviation and the speed; and
transmit data corresponding to the state space, the data used to change an angle of at least one of the plurality of levitation generators or change the speed of the vehicle;
one or more drive motors coupled to at least one of the plurality of levitation generators and operable to adjust the angle of the at least one of the plurality of levitation generators, such that a pitch of a front levitation generator can be adjusted independent of a rear levitation generator, wherein the one or more drive generators operable to receive the transmitted data and adjust the angle of at least one of the plurality of levitation generators;
wherein the plurality of levitation generators are operable to adjust the altitude, roll, and/or pitch of the vehicle.

19. The system of claim 18, wherein at least one of the plurality of sensors is an ultrasonic sensor.

20. A method controlling altitude of a vehicle moving along a guideway for magnetic flight, the method comprising:
receiving, at a controller, data generated by one or more sensors;
determining, at the controller, an altitude of the vehicle relative to the guideway for magnetic flight;
receiving, at the controller, stored data associated with the guideway along a projected flight path of the vehicle;
determining, at the controller, a speed of the vehicle relative to the guideway for magnetic flight,
calculating, at the controller, current deviation of the vehicle from the projected flight path;
calculating, at the controller, estimated future deviation of the vehicle from the projected flight path;
calculating, at the controller and based at least on one of: the altitude, the stored data, the speed, the current deviation and the estimated future deviation, an angle change in for at least one levitation generator;
receiving, at one or more drive motors, the transmitted data and adjusting the angle of at least one of the plurality of levitation generators; and
powering a drive motor that is coupled to at least one of the plurality of levitation generators to adjust the angle of the at least one of the plurality of levitation generators, such that a pitch of a front levitation generator can be adjusted independent of a rear levitation generator, wherein the plurality of levitation generators are operable to adjust the altitude, roll, and/or pitch of the vehicle.

* * * * *